United States Patent [19]

Nelb, II et al.

[11] Patent Number: 4,672,094

[45] Date of Patent: Jun. 9, 1987

[54] METHOD FOR INCREASING THE MOLECULAR WEIGHT OF POLYAMIDES AND POLYESTERAMIDES

[75] Inventors: Robert G. Nelb, II; Kemal Onder, both of North Haven; Karl W. Rausch; John A. Vanderlip, both of Hamden, all of Conn.

[73] Assignee: The Dow Chemical Company, Midland, Mich.

[21] Appl. No.: 819,960

[22] Filed: Jan. 21, 1986

[51] Int. Cl.⁴ .................. C08F 20/00; C08G 18/76; C08G 18/82

[52] U.S. Cl. .................................. 525/440; 528/45; 528/48; 528/51; 528/84; 528/492

[58] Field of Search ............. 528/84, 48, 51, 492; 525/440

[56] References Cited

U.S. PATENT DOCUMENTS

| | | |
|---|---|---|
| 2,333,639 | 11/1943 | Christ et al. .................. 528/84 |
| 4,065,441 | 12/1977 | Andrews et al. ............. 260/78 R |
| 4,072,665 | 2/1978 | Onder ........................... 260/78 R |
| 4,087,481 | 5/1978 | Onder ......................... 260/857 TW |
| 4,115,372 | 9/1978 | Onder ........................... 528/73 |
| 4,129,715 | 12/1978 | Chen et al. .................. 528/67 |
| 4,156,065 | 5/1979 | Onder et al. ................ 528/51 |
| 4,390,667 | 6/1983 | Aharomi et al. ............. 525/420 |
| 4,409,167 | 10/1983 | Kolouch et al. ............. 264/102 |
| 4,420,602 | 12/1983 | Bonk et al. .................. 528/80 |
| 4,420,603 | 12/1983 | Nelb et al. .................. 528/80 |
| 4,501,844 | 2/1985 | Chen et al. .................. 524/451 |
| 4,555,550 | 11/1985 | Droescher et al. .......... 525/424 |

Primary Examiner—Herbert S. Cockeram
Attorney, Agent, or Firm—J. S. Rose

[57] ABSTRACT

A process is described for increasing the molecular weights of thermoplastic polyamides and polyesteramides by fluxing and homogenizing the subject polymers which have been prepared by the reaction of an organic diisocyanate and a dicarboxylic acid with an effective amount of an organic diisocyanate reagent at a temperature of at least about 150° C.

17 Claims, No Drawings

METHOD FOR INCREASING THE MOLECULAR WEIGHT OF POLYAMIDES AND POLYESTERAMIDES

FIELD OF THE INVENTION

This invention relates to a process for increasing the molecular weight of polyamides and is more particularly concerned with increasing the molecular weight of thermoplastic polymers having recurring amide linkages by fluxing and homogenizing said polymers with small amounts of organic diisocyanates.

DESCRIPTION OF THE PRIOR ART

The preparation of thermoplastic polymers having a recurring amide linkage by reaction of organic diisocyanates with dicarboxylic acids and related compounds has been extensively described; see for example, U.S. Pat. Nos. 4,065,441; 4,072,665; 4,087,481; 4,115,372; 4,129,715; 4,156,065; and 4,501,844 which latter describes crystalline polyamides. In these polymerizations the condensation results in the elimination of carbon dioxide. Such thermoplastic polymers are characterized by excellent properties while enjoying the advantages of thermoplasticity.

In some cases these polymers suffer from the drawback of tenaciously retaining residual amounts of the reaction solvent in which they were prepared. Generally speaking, the higher the polymer molecular weight, the greater the difficulty in removing these residues. Another problem which can be encountered is a loss in molecular weight arising either from the presence of trace impurities or thermal cleavage due to excessive heat histories in melt working the materials.

Recent attempts to prepare the diisocyanate/dicarboxylic acid based polymers in the absence of reaction solvents has met with certain success; see U.S. Pat. Nos. 4,420,602 and 4,420,603. However, it remains that their most facile preparation is carried out in the presence of solvents.

U.S. Pat. No. 4,390,667 discloses a method for increasing the molecular weight of polyamides, particularly those derived from lactams and the conventional nylon 66, and the like, by forming a molten mixture of the polyamide with an effective amount of an aryl phosphate.

U.S. Pat. No. 4,409,167 discloses a method for solving the difficulty of extruding high molecular weight poly(ethyleneterephthalate) by melt-extruding a lower molecular weight version of the polymer with an organic diisocyanate. The problem of extruding a bubble-free polyester extrudate, during the evolution of carbon dioxide, is achieved through the use of particular screw-extruder conditions which includes, inter alia, the need for operating in a vacuum and premixing the polyester and diisocyanate prior to fluxing in the extruder.

U.S. Pat. No. 4,555,550 describes polyether ester amides of increased molecular weights produced by heating lower molecular weight substrates with cyclic trimerized isophorone diisocyanates having isocyanate functionality of 3 to 7. These polymers are produced from the reaction of glycols, dicarboxylic acids, and ω-aminocarboxylic acids or their lactams.

We have now discovered a process for increasing the molecular weight of diisocyanate/dicarboxylic acid derived polymers having recurring amide linkages by fusing and mixing them with minor proportions of organic diisocyanates or the corresponding masked diisocyanates. Not only can the molecular weight be raised but residual solvent which may be present can, at the same time, be easily removed. Surprisingly, even though carbon dioxide is evolved in the molecular weight raising process, vacuum is not essential in the venting procedure. Further, premixing of the polymer with the diisocyanate reagent prior to the fusing operation is not a necessity and crosslinking or gelation is not a problem.

The present invention further provides for an overall improved process for the preparation of certain thermoplastic polymers containing amide linkages which process will be described in detail below.

SUMMARY OF THE INVENTION

This invention comprises a process for increasing the molecular weight of a thermoplastic polymer characterized by recurring amide linkages and having been prepared by the reaction of an organic diisocyanate and a dicarboxylic acid which process comprises fluxing and homogenizing said thermoplastic polymer with an effective amount of an organic diisocyanate reagent at a temperature of at least about 150° C.

The term "fluxing" is used in the general sense known to those skilled in the polymer art and means melting or fusing under some type of mechanical agitation.

The term "homogenizing" means the blending together of the recited components so as to form a uniform mixture.

The term "organic diisocyanate reagent" means an organic diisocyanate in the free or blocked form thereof.

DETAILED DESCRIPTION OF THE INVENTION

The reaction between an organic diisocyanate and a dicarboxylic acid to form a thermoplastic polymer characterized by recurring amide linkages as referred to in the patents cited supra can best be represented schematically as follows:

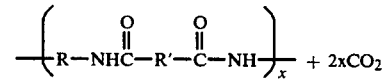

wherein R is the residue of the organic diisocyanate and R' is the residue of the dicarboxylic acid. It will be seen that the reaction gives rise to two moles of carbon dioxide for the reaction of each mole of diisocyanate and dicarboxylic acid. Generally speaking, the process is conducted in an inert organic solvent, particularly in a batch procedure. The present process, in its broadest aspect, provides a means for increasing the molecular weight of a thermoplastic polymer obtained at least in part via the above schematic equation. The term "polymer" as used in its present sense means a polymeric material as opposed to oligomeric but otherwise not restricted in respect of molecular weight.

The novel step in the instant process resides in the fluxing and homogenizing, otherwise known as melt-blending, of the polymer with an effective amount of the organic diisocyanate. While not wishing the present invention to be limited by any theoretical considerations but only by the claims appended hereinbelow, it is believed that the added reagent acts as an extender (in the form of the unblocked diisocyanate) by reacting with terminal carboxylic acid groups on the polymer chains thereby resulting in the increase in polymer chain size. In accordance with the reaction scheme above, carbon dioxide is evolved during the process. Surprisingly, the polymer is obtained bubble-free with increased molecular weight without it being essential to operate under vacuum during the process.

Any conventional apparatus for the melt-blending of polymer forming ingredients in any sequence can be employed. For example, the components can be brought together in solid or solid/liquid form and blended using conventional means such as a barrel mixer, a tumble mixer, and the like. Following this, the mixture can then be melt-blended in a resin kettle equipped with heating means and efficient agitation. Alternatively, the components are brought together and fluxed in the appropriate mixing apparatus such as a Banbury type internal mixer, rubber mill twin screw compounder, and the like, where the homogenizing is completed. Preferably, the process is carried out under the exclusion of air and moisture. This is most effectively accomplished by operating under an inert atmosphere of nitrogen, or argon, or other suitable inert gas.

In one preferred embodiment, the components are brought together and processed in an appropriate melt-extruder from which the product is extruded in the form of strands and the like which are then pelletized. Most preferably, the process is carried out in a vented twin-screw extruder.

The term "effective amount" as it relates to the diisocyanate reagent means an amount which when added to the substrate polymer in accordance with the present invention results in a polymer having a molecular weight greater than that of the substrate.

It will be readily understood by one skilled in the art that the specific quantity to be employed in any given case will depend on a number of factors which include the initial molecular weight, the carboxyl end group content, the weight and type of blocking agent in the case of blocked diisocyanates, as well as the desired molecular weight of the product. Advantageously, the diisocyanate reagent will be employed in the proportions of from about 0.1 to about 10 percent by weight based on the weight of the starting thermoplastic polymer, preferably, from about 0.2 to about 5, most preferably, from about 0.2 to about 3 percent by weight.

As noted above, the fluxing temperature must be at least 150° C. in order to result in fusing or melting the starting polymer substrate and to unblock the diisocyanate if it be employed in blocked form. Advantageously, the temperature falls within the range of about 150° C. to about 350° C., preferably from about 200° C. to about 325° C., most preferably from about 250° C. to about 310° C.

The progress of the molecular weight increase, and thus, indirectly, the time for fluxing and homogenizing depends on the reaction variables discussed above and even the means employed for carrying out the process. The molecular weight of the substrate can be compared with the value determined for the processed polymer at any convenient stage. Generally speaking, the fluxing and homogenizing is carried out until the desired molecular weight increase has been observed. The desired increase may coincide with the maximum increase prior to the occurrence of gelation. When the process is being carried out by the preferred means of melt-extrusion the residence time can be controlled by such factors as the number, internal geometry, and temperature of the various zones in the melt extruder, the rate of propulsion of the mixture and the rate at which it is possible to vent the carbon dioxide.

Polymer molecular weight is simply determined using any of the conventional methods providing direct or indirect molecular weight data, which methods are well known to those skilled in the polymer art. Illustratively, direct methods include number average molecular weight measurements by ebulliometry, freezing-point depression, vapor-phase osmometry, gel permeation chromatography, and weight average molecular weight by light scattering; indirect methods include polymer solution viscosity, melt index by capillary rheometer, and rotational viscometry such as measuring the torque of stirred polymer melts, as for example in a Brabender Plasticorder. If desired, any one of these direct measurements can be correlated with an indirect one in order to provide rapid means for assessing molecular weight information. For example, calibration charts of number average molecular weight versus inherent viscosity for any given polymer system can be used to determine the extent of molecular weight increase by the simple and rapid expedient of an on-line inherent viscosity determination. The preferred means for measuring molecular weight increase comprise the indirect methods of solution viscosity, capillary rheometry, and rotational viscometry.

The organic diisocyanate reagents can be any of the diisocyanates or blocked forms thereof known to those skilled in the polymer art which include aromatic, aliphatic, or cycloaliphatic diisocyanates having from 2 to 18, preferably 6 to 15 carbon atoms. Preferably, the diisocyanates are employed in the unblocked state. Preferred as a class are the aromatic diisocyanates.

Illustrative of the diisocyanates, but not limiting thereof, are hexamethylene diisocyanate, octamethylene diisocyanate, decamethylene diisocyanate, 1,4-cyclohexanediisocyanate, methylenebis(4-cyclohexyl isocyanate), isophorone diisocyanate (1-isocyanato-2-isocyanatomethyl-3,5,5-trimethylcyclohexane), m- and p-phenylene diisocyanate, 2,4-toluenediisocyanate, 2,6-toluenediisocyanate (and mixtures of 2,4- and 2,6-toluenediisocyanate), methylenebis(phenyl isocyanate), including 4,4'-, 2,4'- and mixtures thereof, 4,4'-methylenebis(2-methylphenyl isocyanate), and the like.

Preferred species include m- and p-phenylene diisocyanates, 2,4-, 2,6-, and mixtures of 2,4- and 2,6-toluene diisocyanate, methylenebis(phenyl isocyanate) and the like. Most preferred is 4,4'-methylenebis(phenyl isocyanate).

In the event the diisocyanates are employed in their blocked or masked form, any of the classes or species set forth above can have any proportion up to 100 percent of their isocyanate groups blocked by any of the masking agents known in the art. For example, see U.S. Pat. No. 4,530,859 whose disclosure relative to the formation of blocked isocyanates and various blocking agents therefor, is incorporated herein by reference. Typical of the isocyanate blocking agents are phenols, lactams, alcohols, oximes, and the like. Preferred are the lactams such as ε-caprolactam, δ-valerolactam, and the like. Additionally, molecules which are capable of thermally rearranging to diisocyanates can also be considered as blocked diisocyanates and can be employed in the present method. Illustrative of such blocked diisocyanates are the bis cyclic ureas disclosed in U.S. Pat. Nos.

4,190,599 and 4,410,689 which can thermally rearrange to aliphatic diisocyanates; the disclosures of these two patents relative to masked diisocyanates are incorporated herein by reference.

While not essential, it is preferred to employ as the added diisocyanate reagent, one which corresponds to the predominant diisocyanate employed in the preparation of the substrate polymer.

The diisocyanate reagent may be incorporated into the present process either in the form of a solid or liquid. Whatever its form it can be preblended with the thermoplastic polymer prior to the fluxing and homogenizing step. Alternatively, the thermoplastic polymer can be prefluxed followed by the addition of the reagent with fluxing and homogenizing.

Optionally, because of the small proportions in which the diisocyanates will be added, and, to avoid experimental weighing errors, the diisocyanate can be employed as a solution dissolved in an inert liquid carrier. The term "inert" means any organic liquid which will not react with the polymer or diisocyanate or otherwise interfere with the present process. Typical of such liquids would be organic solvents such as aromatic solvents inclusive of benzene, toluene, xylene, chlorobenzene, dichlorobenzene, and the like; dipolar aprotic solvents inclusive of dimethylformamide, diethylformamide, dimethylacetamide, tetramethylene sulfone, acetonitrile, dimethyl sulfoxide, N-methyl-pyrrolidone and the like; liquid aryl phosphates inclusive of tri(p-chlorophenyl)phosphate, tri(p-bromophenyl)phosphate, tri(tolyl)phosphate, tri(xylyl)phosphate, and the like. The proportions in which the diisocyanate can be employed in the form of a solution is in no way critical. Advantageously, the concentration of diisocyanate can fall within the range of from about 10 percent by weight to about 95 percent by weight based on the weight of diisocyanate and carrier. Preferably, the diisocyanate is from about 25 to about 75 percent by weight of the solution.

When the carrier is an organic solvent having a vaporization temperature range below the temperature of fluxing and homogenizing then it will be vented along with any carbon dioxide formed during the process. Similarly, if masked diisocyanates are employed the evolved blocking agents will be vented, or, alternatively, they may react with the fluxed polymer matrix. When the vaporization temperature is above the operating conditions of the present method, then it will remain in the polymer product obtained. In this latter event, it is advantageous to employ liquid carriers which are capable of imparting beneficial properties to the resulting polymers such as fire retardancy, lubricity and the like. Accordingly, the aryl phosphates discussed above are advantageously employed as they serve both as liquid carriers and impart fire retardancy to the resulting polymers.

Quite surprisingly, these aryl phosphates when employed as carriers for the diisocyanates in the present process have little or no effect on increasing the polymer molecular weight (see Example 2 below). This is in contrast to U.S. Pat. No. 4,390,667 cited supra which discloses such compounds used to increase the molecular weight of polyamides of the nylon 6 and 66 types.

The process in accordance with the present invention is particularly adaptable to those thermoplastic polymers comprising the product of reaction of at least one aromatic diisocyanate and a dicarboxylic acid selected from the group consisting of aromatic dicarboxylic acids, aliphatic dicarboxylic acids, dicarboxylic acid terminated polyesters, dicarboxylic acid terminated polyethers, and mixtures of any two or more such acids.

Such polymers and their preparation are fully exemplified in the polyamides and polyesteramides disclosed in U.S. Pat. Nos. 4,065,441; 4,087,481; 4,129,715; and 4,501,844, all cited supra and the disclosures of which are incorporated herein by reference.

In one embodiment of the present method, the polyamides or polyesteramides have been prepared from the appropriate diisocyanates and dicarboxylic acids in substantially stoichiometric proportions in a solvent as taught by the patents already incorporated herein. That is to say, the polymer which is to have its molecular weight increased was prepared initially to achieve its maximum molecular weight.

In yet another embodiment of the present method, polyamides and polyesteramides having purposely low molecular weights and containing from 0 to about 20, preferably about 0 to about 10 percent by weight of solvent can have their molecular weights increased and the solvent removed by the process in accordance with the present invention. Accordingly, polymers are prepared optionally in a solvent using any of the diisocyanates and dicarboxylic acids disclosed above wherein the proportions of diisocyanate employed fall within the range of from about 0.90 to about 0.99 equivalent per equivalent of said dicarboxylic acid. Solvent, if employed, is removed from the low molecular weight polymer product until its residual content is from about 0 to about 20 percent by weight (preferably from about 1 to about 10 percent by weight).

The term "solvent" as used hereinabove means any of the known reaction solvents disclosed in the patents cited supra, already incorporated herein, and illustratively includes tetramethylene sulfone, dichlorobenzene, monochlorobenzene, α-butyrolactone, N-methylpyrrolidone, N,N-dimethylformamide, N,N-dimethylacetamide, dimethyl sulfoxide, and the like.

In a preferred embodiment of the present process the above described polymers prepared with a deficit of diisocyanate are fluxed in a first zone of a vented twin-screw extruder at a temperature of from about 150° C. to about 350° C.; there is then added into said fluxed polymers via an inlet port from about 0.1 to about 10 percent by weight of an aromatic diisocyanate; the mixtures are fluxed and homogenized at the same temperature range set forth above; the carbon dioxide and solvent, when present, are vented; and the resulting polymers removed from the extruder via a shaping zone. An even more preferred embodiment is one wherein the aforesaid steps are carried out continuously.

Any of the aromatic diisocyanates known in the art can be employed. Illustrative but not limiting thereof are 4,4'-methylenebis(phenyl isocyanate), mixtures of 4,4'- and 2,4'-methylenebis(phenyl isocyanate), 2,4-toluenediisocyanate, 2,6-toluenediisocyanate, dianisidine diisocyanate, tolidine diisocyanate, 1,5-naphthalene diisocyanate, as well as mixtures of two or more of said diisocyanates. Preferred of the above diisocyanates are 4,4'-methylenebis(phenyl isocyanate), 2,4-, and 2,6-toluenediisocyanates, and mixtures of any of these diisocyanates in any proportions.

Any of the dicarboxylic acids previously employed in the art to prepare polyamides can be employed. Illustrative of said acids are aromatic dicarboxylic acids such as isophthalic, terephthalic, phthalic, benzophenone dicarboxylic and diphenylene dicarboxylic acids, and the like; aliphatic dicarboxylic acids such as succinic, adipic, azelaic, pimelic, glutaric, sebacic, decanedioic, dodecanedioic, brassylic acids and the like, and mixtures of any two or more of the above acids can be employed if desired. Preferred of the acids are isophthalic, terephthalic, adipic, azelaic, pimelic, glutaric, sebacic, and mixtures of any two or more.

The dicarboxylic acid terminated polyesters or polyethers are prepared in a variety of known ways. Illustratively, they are obtained by reacting an excess of a dicarboxylic acid, which can be any of those described and identified above including mixtures of two or more of said acids, with a monomeric or polymeric diol. The monomeric diols can be any of those conventionally employed in the preparation of polyester diols. Illustrative of monomeric diols are ethylene glycol, propylene glycol, 1,4-butanediol, 1,2-hexanediol, 1,5-pentanediol, and the like.

The polymeric diols can be any polyether or polyester diols having molecular weights within the range of about 400 to about 4000. Illustrative of polyether diols are the poly(alkylene ether) diols obtained by polymerizing one or more cyclic ethers such as ethylene oxide, propylene oxide, butylene oxide, and tetrahydrofuran. The poly(alkylene ether) diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and like alkylene oxides with homopolymers of conjugated alkadienes such as butadiene, isoprene, and the like and copolymers of said alkadienes with vinyl monomers such as acrylonitrile, methacrylonitrile, styrene, and the like. Particularly preferred polyether diols for use in preparing polyesteramides are poly(tetramethylene glycol) and ethylene oxide capped polypropylene glycols wherein the ethylene oxide content is within the range of about 5 to about 40 percent.

Illustrative of the polyester diols are those obtained by reacting a dicarboxylic acid or mixture of dicarboxylic acids such as adipic, suberic, azelaic, glutaric, 1,12-dodecanedioic acids, and the like, with an excess, over the stoichiometric amount, of a dihydric alcohol such as ethylene glycol, propylene glycol, 1,4-butanediol, and the like including mixtures of two or more such diols. Preferred polyester diols are the poly(ethylene adipate)glycols, poly(butylene adipate)glycols, poly(ethylene azelate)glycols, poly(butylene azelate)glycols, and the like.

Advantageously, the polyamides and polyesteramides are prepared in the presence of a catalyst as taught by the patents cited supra. Illustratively, these include alkali metal alkoxides, N-alkali metal lactamates, and the preferred phospholene-1-oxides. Said catalysts are generally employed in the amounts of from about 0.001 to about 5 percent by weight of total reactants.

The present process is useful in upgrading the properties of the thermoplastic polymers which are below specification. It is also useful for increasing the molecular weights and thus improving the properties of the polymers described herein which have been deliberately prepared with low molecular weights in order to faciltate solvent removal under favorable thermal conditions with reduced tendency of polymer degradation. The polymers prepared in accordance with the present invention can be extruded in the form of hose, tubing, wire coating, and the like; and injection molded to produce articles such as bushings, seal faces, compressor vanes, electrical connectors, and automotive parts.

The following examples describe the manner and process of using the invention and set forth the best mode contemplated by the inventors of carrying out the invention but are not to be construed as limiting.

EXAMPLE 1

The following experiment describes a process in accordance with the present invention whereby the molecular weight, as determined by inherent viscosity measurement, of a polyamide is increased.

A polyamide polymer of purposely low molecular weight was prepared by reacting the following ingredients in the stated proportions of parts by weight using a procedure in accordance with U.S. Pat. No. 4,065,441: 402.1 parts (4.28 equivalents) of azelaic acid, 132.5 parts (1.82 equivalents) of adipic acid, and 2.25 parts of 1,3-dimethylphospholene-1-oxide were dissolved in 3075 parts of tetramethylene sulfone and the solution heated to a temperature of from about 210° C. to about 214° C.; 4,4'-methylenebis(phenyl isocyanate) was added slowly to the reaction mixture and at about 18 hours into the addition after about 725 parts had been added (about 31.5 parts short of the stoichiometric amount), a sample of the reaction solution was removed and quenched by pouring into excess water. Thus, there was obtained a polyamide prepared at an isocyanate index of about 0.96 (or less than stoichiometry) which was recovered as a solid from the water. It was pulverized in a blender, washed repeatedly with water and thoroughly dried in a dessicant bed dryer. The polymer was characterized by an acid equivalent weight of 6775 and $\eta_{inh}=0.493$ dl/g. (0.5 percent solution in lithium bromide/dimethylformamide at 30° C.).

An 80 g. sample of the polyamide was charged to the mixing head of a C. W. Brabender Plasticorder maintained at about 255° C. with a rotor speed set at 50 r.p.m. and with the torque recording scale set at 5000 meter-grams maximum reading. The polymer sample fluxed to a constant torque of 500 meter-grams. Over a 20 minute mixing period the melt was very fluid with insufficient melt viscosity to provide good mixing; the isolated polymer had an $\eta_{inh}=0.493$ dl/g. (0.5 percent solution in lithium bromide/dimethylformamide at 30° C.).

The above procedure with 80 g. of the polyamide was repeated but with the addition of 1.5 g. of 4,4'-methylenebis(phenyl isocyanate) [MDI] to the prefluxed polymer. The polymer sample fluxed to a constant torque or melt viscosity of 1150 meter grams at 255° C. over the 20 minute period; the isolated polymer had an $\eta_{inh}=0.654$ dl/g. (0.5 percent solution in lithium bromide/dimethylformamide at 30° C.). Thus the molecular weight of the polymer was raised compared with the fluxed sample without the MDI.

Because of the difficulty of accurately weighing the small portion of MDI to the mix head, the procedure was repeated but with the 1.5 g. of MDI dissolved in 2.4 g. of trixylyl phosphate as a carrier. The polymer sample fluxed to a constant torque of 1900 meter-grams at 255° C. over the 20 minute period. During this period the polymer melt became rubbery and inhomogeneous indicating the possible cross-linking of the polymer. The $\eta_{inh}=0.808$ dl/g. (0.5 percent solution in lithium bromide/dimethylformamide at 30° C.). Thus the molecular weight of the polymer was raised compared with the fluxed sample without the MDI. Further, the higher inherent viscosity over the 0.654 dl/g. value for the sample above with the MDI alone may also indicate the beginning of some cross-linking as noted by the melt behaviour of this latter polymer.

EXAMPLE 2

Using the same apparatus and substantially the same general procedure described in Example 1, the following experiment describes a process in accordance with the present invention whereby the molecular weight, as determined by melt viscosity measurement, of a polyamide is increased.

The base polyamide polymer was similar to the one described in Example 1 differing only in having an isocyanate index of 0.965 and characterized by an acid equivalent weight of 4690. The polymer also contained about 2 percent by weight of residual tetramethylene sulfone. The 80 g. samples of the polymer were added to the mixing head and fluxed at 255° to 260° C. Thereafter the diisocyanates in the proportions by weight set forth in Table I below were added to the mixing head and the temperature raised to 275° to 280° C.

Run (a) was the control of the polymer without added diisocyanate and when fluxed had a melt viscosity which translated to only 300 meter-grams on the recording chart. However, after the 20 minute period the sample of liquid MDI (described in footnote 1 of Table I) was added in run (h) and the polymer melt reached its maximum torque of 1,600 meter-grams only 4 minutes after the isocyanate addition. This signified an increase in the polymer molecular weight which resulted in a good melt viscosity.

Runs (b) to (e) show the effect on torque read-out when MDI was added in the stated proportions. The remarks are directed to the polymer melt characteristics as determined by visual observations.

The substitution of liquid MDI (run f) for MDI or the use of trixylyl phosphate as carrier (run g) yielded no significant change in the product polymers obtained.

TABLE I

|   | Diisocyanate Added in gms. | Torque (meter-grams) | Remarks |
|---|---|---|---|
| (a) | 0 | 300 | fully fluxed |
| (b) | 2.1 g. MDI | 3,500 | rubbery melt, not preferred |
| (c) | 1.9 g. MDI | 3,500 | less rubbery than (b), good melt viscosity |
| (d) | 1.7 g. MDI | 2,000 | viscous melt, preferred melt viscosity |
| (e) | 1.6 g. MDI | 1,600 | not as viscous as (d), good melt viscosity |
| (f) | 1.8 g. liq. MDI[1] | 1,600 | same as (e), good melt viscosity |
| (g) | 1.8 g. liq. MDI 2.0 g. TXP[2] | 1,600 | same as (e) or (f), good melt vicosity |
| (h) | 1.8 liq. MDI added to (a) already fluxed | 1,600 | maximum torque reached within 4 minutes of addition, good melt viscosity |

Footnotes to TABLE 1
[1]Liquid MDI: a liquefied form of 4,4'-methylenebis-(phenyl isocyanate) in which a portion of the isocyanate groups have been converted to carbodiimide (I.E. = 143).
[2]TXP: is trixylyl phosphate and was added as a carrier to facilitate more accurate weighing of the MDI similarly to Example 1.

EXAMPLE 3

The following experiment describes how a polyamide similar to both of those described in Examples 1 and 2, except that it was prepared with stoichiometric proportions of the carboxylic acid/isocyanate reactants, was treated in accordance with the present invention to effect an increase in polymer molecular weight.

The pelletized polyamide was tumbled in a jar with a solution comprising MDI dissolved in an equal proportion of trixylyl phosphate. The proportion of the solution employed with respect to the polyamide was such that the MDI and trixyl phosphate concentrations were each 0.5 part per hundred parts of polyamide.

A 500 g. sample of the coated pellets was extruded through a Brabender extruder to form a $\frac{1}{8}''$ diameter rope. Extrusion conditions were as follows: barrel size of $\frac{3}{4}''$ diameter with L/D of 24/1; single screw-straight flight, 50 r.p.m.; barrel temperature of 265° C. The rope was chopped into pellets. A 500 g. sample of the untreated pellets was extruded similarly to the treated ones above. Inherent viscosities determined at 0.5 percent solution in lithium bromide/dimethylformamide at 30° C. for the treated and untreated sample was 0.695 dl/g. and 0.60 dl/g. respectively.

The treated and untreated extrudates were injection molded into tensile test bars of $8\frac{1}{2}'' \times \frac{3}{4}'' \times \frac{1}{8}''$ (in accordance with ASTM D638-61T test procedure). The molding machine was an Arburg Model 220E/150. The molding conditions were as follows: pressure=800-850 psi; screw speed (r.p.m.)=110; barrel temperature of 265° C. from feed zone to 275° C. at last zone; mold temperature=75° to 80° C.

Notched Izod impact strengths (ASTM Test D256-56, ft-lbs/in. of notch) for the treated and untreated sample at $\frac{1}{8}''$ notch was 2.18 and 0.51 respectively.

The treatment of the polyamide resulted in its inherent viscosity and impact strength both increasing which are the result of an increase in molecular weight.

EXAMPLE 4

This experiment describes how the molecular weight, as determined by inherent viscosity measurement, of a polyamide is increased using a process in accordance with the present invention.

A polyamide polymer of purposely low molecular weight was prepared by reacting the following ingredients in the proportions by weight using a procedure in accordance with U.S. Pat. No. 4,072,665 as follows: 291.2 parts (3.1 equivalents) of azelaic acid, 100.8 parts (1.22 equivalents) of isophthalic acid, 134.4 parts (1.84 equivalents) of adipic acid, 1.5 parts of benzoic acid, 5.1 parts of an antioxidant (Irganox 1098 supped by Ciba Geigy), and 2.28 parts of 1-methyl-phospholene-1-oxide were dissolved in 3085 parts of tetramethylenesulfone and the solution heated to about 210° to 215° C.; 4,4'-methylenebis(phenyl isocyanate) was added slowly to the reaction mixture and at about 16 hours into the addition, after about 755 parts had been added, a sample of the reaction solution was removed and quenched by pouring into excess water. Thus, there was obtained a polyamide prepared at an isocyanate index of about 0.98 which was recovered as a solid from the water. It was pulverized in a blender, washed repeatedly with water and the powder thoroughly dried in a dessicant bed dryer. The powder contained about 2 percent by weight of solvent.

To facilitate the preparation of powder blends containing MDI prior to extrusion, a blending concentrate was prepared by thoroughly mixing a solution of 50 g. of MDI dissolved in 150 ml. of dry acetone with 450 grams of the resin powder obtained above and then removing the acetone by evaporation.

Using the Brabender extruder and conditions described in Example 3 above, four different extrusions were carried out. The first was with the neat polyamide obtained above, while the second, third, and fourth were extrusions carried out with mixtures of the polyamide with sufficient amounts of the blending concentrate in each case to provide MDI concentrations of 0.5, 1.0, and 1.5 parts per hundred of polyamide respectively. The residual solvent was removed from the polyamide during the extrusions. The inherent viscosity of each extruded sample was obtained at a 0.5 weight percent concentration at 30° C. in N-methylpyrrolidone as follows.

first sample: 0.464 dl/g.
second sample: 0.512 dl/g.
third sample: 0.562 dl/g.
fourth sample: 0.622 dl/g.

The molecular weights of the treated samples showed ascending molecular weight over the untreated first sample.

EXAMPLE 5

This experiment describes how the molecular weight, as determined by inherent viscosity measurement, of a polyesteramide (prepared in accordance with U.S. Pat. No. 4,129,715) is increased using a process in accordance with the present invention.

A carboxylic acid terminated hexamethylene adipate was prepared by the following procedure using the ingredients in the stated proportions of parts by weight. A 500 gallon reactor was charged with 1614 lb. of hexamethylene adipate diol [Rucoflex S105-110; Hooker; Eq. wt. ca 500], 345 lb. of azelaic acid, 265 lb. of adipic acid, 717 g. of p-toluene sulfonic acid monohydrate, and 1081 lb. xylenes. The reaction solution was heated to its reflux temperature and the water evolved from the condensation reaction was removed by azeotropic distillation. At the completion of the reaction the reactor contents were cooled to 100° to 120° C. and the xylenes were removed by vacuum distillation. The product, 2169 lbs., had an acid number of about 103 (Eq. wt.=545).

The polyesteramide was prepared by reacting the following ingredients in the stated proportions by weight as follows: 112.3 parts (1.2 equivalents) of azelaic acid, 530 parts (0.98 equivalent) of the acid terminated hexamethylene adipate prepared above, 8.2 parts of an antioxidant (Irganox 1098), and 1.7 parts of 1,3-dimethylpholene-1-oxide were dissolved in 3285 parts of tetramethylene sulfone and the solution heated from about 210° to about 211° C.; molten 4,4'-methylenebis(phenyl isocyanate) was added slowly to the reaction mixture and after about 8 hours 276 parts (2.2 equivalents) were added. Thus there was obtained a polyesteramide prepared at just slightly over isocyanate index. The solvent was removed under two vacuum stages of first 65 mm. followed by 90 mm. of mercury at a temperature of about 210° C. to 285° C.

Using the Brabender extruder and conditions described in Example 3 except for a temperature range of 230° C. in the feed port and 235° to 245° C. on the barrel, two extrusions to ⅛" rope were carried out. The first was 500 grams of the neat polyesteramide while the second was a blending extrusion of 500 grams of the polyesteramide coated by preblending with sufficient solution of equal parts of MDI dissolved in trixylyl phosphate to provide both additives at the 0.5 weight percent level.

Both samples of extruded polyesteramide in pelletized form were injection molded, each one into 5"×5"×1/16" plaques using the Arburg injection molding machine and the conditions described in Example 3 except for the temperature range of 235° C. to 255° C. from feed zone to barrel end; mold temperature was 70° C.

The inherent viscosities as determined at 0.5 weight percent solutions in lithium chloride/dimethylformamide at 30° C. were 0.611 dl/g. for the neat polymer and 0.733 dl/g. for the blended sample. A molecular weight increase had occurred. The samples had the following physical properties:

|  | Control | Blended Sample |
| --- | --- | --- |
| Elastic modulus (psi) |  |  |
| 50% | 1770 | 1780 |
| 100% | 1890 | 2140 |
| 300% | 2860 | 3450 |
| Tensile str. (psi) | 3650 | 3460 |
| Elongation at break (%) | 410 | 285 |
| Tensile set at break (%) | 60 | 30 |

The physical property differences between the samples reflect the higher molecular weight of the blended sample.

EXAMPLE 6

The apparatus employed in the following procedure was a twin screw reactor-extruder (Werner and Pfleiderer Model ZDSK28) equipped with five sections each provided with independent heat control units. The co-rotating twin screws were each 77.1 cm. in length and 28 mm. in diameter. Two vent ports were provided in the barrel of the apparatus; the first was at a distance of about 28.0 cm. from the feed port and the second about 53.0 cm. from said feed port. The apparatus was provided with means for purging the vent ports as well as the feed port with a continuous stream of nitrogen. Conveying screw elements were employed with no kneading screw elements. Wide-pitch screw elements in the first vent sections were installed to facilitate devolatilization.

With only the first vent port open and closing the second, a sample of the polyamide having an isocyanate index of 0.965 and described in Example 2 above was fed into the feed port and extruded into an extrudate measuring ⅛"×1/16" in cross-section under the following conditions: screw speed=125 r.p.m.; zone temperatures, zone 1=255° C.; zone 2=260° C.; zone 3=263° C.; zone 4=261° C.; zone 5 (die)=259° C.; torque generated=600 to 700 inch-lbs.

The inherent viscosity of the extruded material determined in 0.5 weight percent solution in N-methylpyrrolidone at 30° C. was 0.519 dl/g.

In accordance with the present invention, a 1300 g. sample of the polyamide polymer above in the form of warm dry pellets, was tumbled in a gallon jar with 13 g. of molten MDI until the pellets cooled and were evenly coated with solidified MDI at a concentration of 1 percent by weight MDI. The coated polymer was fed into the feed port of the Werner Pfleiderer and extruded to the ⅛"×1/16" profile under the following conditions: screw speed=100 to 120 r.p.m.; zone temperatures, zone 1=282° C.; zone 2=278° C.; zone 3=273° C.;

zone 4=280° C.; zone 5 (die)=276° C.; torque generated=900 inch-lbs.

The inherent viscosity of the extruded material determined similarly as above was 0.627 dl/g. An increase in polymer molecular weight had occurred over the control sample above.

EXAMPLE 7

The Werner Pfleiderer apparatus described above was modified to the extent that both vent ports were open and under nitrogen purge along with the feed port. Also the screws differed from above by having the wide-pitch screw sections under both vent port sections. A control sample of the same polyamide as in Example 6 was fed into the feed port and extruded to the ⅛"×1/16" profile under the following conditions: feed rate of polymer=15 g./minute; screw speed=75 r.p.m.; zone temperatures, zone 1=288° C.; zone 2=276° C.; zone 3=272° C.; zone 4=275° C.; zone 5 (die)=261° C.; torque=560 to 570 inch-lbs. This control sample was identified as A and pelletized followed by grinding in a Wiley Mill to pass a 10 mesh screen. Its inherent viscosity is reported below.

The first vent of the Werner Pfleiderer was then fitted with a 1/16" O.D. (0.050" ID) stainless steel addition tube located as close to the screw as possible near the downstream side of the vent opening. The second vent was open to atmospheric pressure and both vents were purged with nitrogen. The addition tube was connected to a Nichols/Zenith gear pump connected in turn to a reservoir containing a solution of 25 weight percent of the liquid MDI described in Footnote 1 of Example 2 above, dissolved in trixylyl phosphate.

The following continuous reaction-extrusion in accordance with the present invention was carried out by prefluxing the base polyamide of Example 6 by adding it to the feed port at a rate of 15.0 g/minute. At the same time the liquid MDI solution was fed through the addition tube at the rate of 0.64 g/minute. This amounts to a concentration of isocyanate and trixylyl phosphate in the polyamide of 1.07 and 3.2 weight percent respectively. The ⅛"×1/16" extrudate was obtained under the following conditions: screw speed=75 r.p.m.; zone temperatures, zone 1=289° C.; zone 2=275° C.; zone 3=273° C.; zone 4=262° C.; zone 5 (die)=261° C.; torque=900 to 950 inch-lbs. The extrudate was pelletized and ground to pass a 10 mesh screen. Its inherent viscosity is reported below identified as sample B.

A repetition of the above continuous reaction-extrusion was carried out at the same feed rate of base polyamide but with the feed rate of the isocyanate solution reduced to 0.50 g/minute. This amounts to a concentration of isocyanate and trixylylphosphate of 0.83 and 2.5 weight percent respectively. The extrudate was obtained under the following conditions: screw speed =70 r.p.m.; zone temperatures, zone 1=289° C.; zone 2=276° C.; zone 3=276° C.; zone 4=278° C.; zone 5 (die)=262° C.; torque=800 to 850 inch-lbs. The extrudate was pelletized and ground to pass a 10 mesh screen. Its inherent viscosity is reported below identified as sample C.

The inherent viscosities of the three samples were each determined at 0.5 weight percent in N-methylpyrrolidone at 30° C. and had the following values:
Sample A=0.522 dl/g.
Sample B=0.679 dl/g.
Sample C=0.626 dl/g.

Samples B and C had higher molecular weights than the untreated Sample A.

EXAMPLE 8

The apparatus employed in the following procedure was a counter-rotating twin screw reactor-extruder (Leistritz LSM 30.34) equipped with nine barrel sections each one 120 mm. in length and each provided with independent heat control units except the first section which was the feed zone. The counter-rotating twin screws were each 1200 mm. in length and 34 mm. in diameter. Two vent ports were provided, the first in the sixth section and the second in the eighth section. The vent ports were connected to a water vacuum pump which provided a vacuum of 950 mbar. Two shearing disks were employed in the fifth zone of the screw to form a melt seal allowing the vacuum to hold. Wide pitch screw elements were installed in the venting sections to facilitate devolatilization. A double strand (⅛" diameter) die was used.

A polyamide polymer of purposely low molecular weight was prepared by reacting the following ingredients in the proportions by weight using the procedure of U.S. Pat. No. 4,087,481 as follows: 259 parts of isophthalic acid and 2.25 parts of 1-methylphospholene-1-oxide were dissolved in 3075 parts of tetramethylene sulfone at 110° to 120° C. and the solution temperature raised to about 210° C.; 81.5 parts of 2,4-toluene diisocyanate was added over about 1 hour thereafter the reaction solution cooled to about 150° C. and 296.3 parts of azelaic acid were added to the solution; the temperature was raised to about 210° C. and 644.5 parts (0.9725 index) of MDI added over a 20 hour period; the reaction solution was passed through a first thin film evaporator (Filmtruder #1) operating under 100 Torr pressure and heating temperature (circulating oil) of about 286° C. with the discharge stream feeding to a second thin film evaporator (Filmtruder #2) operating under 200 Torr and 268° C.; the discharge temperature of the molten polyamide from the evaporator was 289° C. and it was fed through a die as a ⅛" strand onto an endless belt where it cooled, solidified, and was led to a chopper which pelletized the solid polyamide.

Thus, there was obtained a polyamide prepared at an isocyanate index of 0.9725; solvent content was 7.34 percent by weight (as measured by sulfur combustion analysis); and $\eta_{inh}$=0.55 dl/g. (0.5 weight percent concentration at 30° C. in N-methylpyrrolidone).

A sample of the polyamide prepared as described above was fed into the feed port of the reactor-extruder at the rate of 50 g. per minute under the following extruder conditions: screw speed=60 r.p.m.; zone temperatures,zone 1=255° C.; zones 2 through 4=298° C.; zones 5 through 8=299° C. and zone 9 (die)=294° C.

Thus, there was produced a control sample having an inherent viscosity of 0.56 dl/g. (0.5 weight percent solution of N-methylpyrrolidone at 30° C.) and solvent content of about 1 percent by weight (determined by sulfur combustion analysis).

In accordance with the present invention, 1600 g. of warm dry pellets of the polyamide prepared above were mixed with 3.2 g. of molten MDI and tumbled in a jar until the pellets cooled and were evenly coated with the solidified MDI at a concentration of 0.2 percent by weight. The coated pellets were fed into the feed port of the reactor-extruder at the rate of 50 g/minute under the following extruder conditions: screw speed=60 r.p.m.; zone temperatures, zone 1=259° C.; zone 2=299° C.; zones 3 through 7=298° C.; zone 8=299° C.; and zone 9 (die)=293° C.

Thus there was produced sample D having an inherent viscosity of 0.59 dl/g. (0.5 weight percent in N-methylpyrrolidone at 30° C.) and solvent content of about 1 percent by weight.

A second sample E was also produced in accordance with the present process when 1650 g. of the above polyamide pellets were mixed with 6.6 g. of molten MDI and fed to the reactor extruder using the same procedures described above for sample D except for the following zone temperatures, zone 1=265° C.; zone 2=301° C.; zones 3 through 8=304° C.; and zone 9 (die)=299° C.

Sample E was characterized by an inherent viscosity of 0.63 dl/g. (0.5 weight percent in NMP at 30° C.) and solvent content of about 1 percent by weight.

The three samples were injection molded into test bars and had the following physical properties:

|  | Control | Sample D | Sample E |
|---|---|---|---|
| % MDI | 0 | 0.2 | 0.4 |
| Elongation (%) |  |  |  |
| Yield | None | 8.8 | 9.3 |
| Break | 6 | 13.5 | 16 |
| Tensile str. (kpsi) |  |  |  |
| Yield | None | 15 | 15 |
| Break | 12 | 13 | 12 |
| Notched Izod[1] ft-lbs/in. of notch | 1.67 | 1.74 | 2.02 |
| HDT[2] |  |  |  |
| 66 psi | — | 170 | 166 |
| 264 psi | — | 157 | 153 |

[1]Notched Izod impact strength; measured in accordance with ASTM Test D256-56.
[2]HDT: Heat deflection temperature measured at the stated pressures in accordance with ASTM Test D648-56.

The generally superior properties of samples D and E over the control reflect the improved molecular weights of these two samples.

We claim:

1. A process for increasing the molecular weight of a preformed thermoplastic polymer characterized by recurring amide linkages and having been prepared by the reaction of an organic diisocyanate and a dicarboxylic acid which process comprises fluxing and homogenizing said thermoplastic polymer with an effective amount of an organic diisocyanate reagent at a temperature of at least about 150° C.

2. A process according to claim 1 wherein the amount of said diisocyanate reagent is from about 0.1 to about 10 percent by weight.

3. A process according to claim 1 wherein said fluxing and homogenizing is carried out at a temperature of from about 150° C. to about 350° C.

4. A process according to claim 1 wherein said diisocyanate reagent is an aromatic diisocyanate.

5. A process according to claim 1 wherein said diisocyanate reagent is employed as a solution in a liquid carrier.

6. A process according to claim 1 wherein said fluxing and homogenizing is carried out in a melt-extruder apparatus.

7. A process according to claim 1 wherein said fluxing and homogenizing is carried out in a vented twin-screw extruder.

8. A process according to claim 1 wherein said thermoplastic polymer comprises the product of the reaction of at least one aromatic diisocyanate and a dicarboxylic acid selected from the group consisting of aromatic dicarboxylic acids, aliphatic dicarboxylic acids, dicarboxylic acid terminated polyesters, dicarboxylic acid terminated polyethers, and mixtures of any two or more such acids.

9. A process according to claim 1 wherein said thermoplastic polymer has been prepared from said diisocyanate and said dicarboxylic acid in substantially stoichiometric proportions.

10. A process according to claim 1 wherein said thermoplastic polymer contains from 0 to about 20 percent by weight of solvent and has been prepared from said diisocyanate and said dicarboxylic acid in the proportions of from about 0.90 to about 0.99 equivalent per one equivalent respectively.

11. A process according to claim 1 wherein said thermoplastic polymer has been prepared from 4,4'-methylenebis(phenyl isocyanate) and a dicarboxylic acid mixture comprising adipic and azelaic acids and said added diisocyanate is selected from 4,4'-methylenebis(phenyl isocyanate) or liquefied form thereof.

12. A process according to claim 1 wherein said thermoplastic polymer has been prepared from 4,4'-methylenebis(phenyl isocyanate) and a dicarboxylic acid mixture comprising azelaic acid and azelaic acid terminated poly(hexamethylene adipate) and said added diisocyanate is selected from 4,4'-methylenebis(phenyl isocyanate) or liquefied form thereof.

13. A process according to claim 1 wherein said thermoplastic polymer has been prepared from 4,4'-methylenebis(phenyl isocyanate) and a dicarboxylic acid mixture comprising azelaic, adipic, and isophthalic acids and said added diisocyanate is selected from 4,4'-methylenebis(phenyl isocyanate) or liquefied form thereof.

14. A process for increasing the molecular weight of, and, optionally removing solvent from, a preformed thermoplastic polymer containing from 0 to about 20 percent by weight of solvent said polymer characterized by recurring amide linkages and having been prepared by the reaction of from about 0.90 to about 0.99 equivalent of at least one aromatic diisocyanate with about one equivalent of at least one dicarboxylic acid which process comprises:
   (i) fluxing said thermoplastic polymer at a temperature of from about 150° C. to about 350° C. in a first mixing and heating zone of a vented twin-screw extruder;
   (ii) adding into said fluxed thermoplastic polymer via an inlet port of said extruder from about 0.1 to about 10 percent by weight of an aromatic diisocyanate;
   (iii) fluxing and homogenizing the resulting mixture at a temperature of from about 150° C. to about 350° C.;
   (iv) venting the carbon dioxide and solvent, when present, in a vented zone during said fluxing and homogenizing; and
   (v) removing the resulting polymer from said extruder via a shaping zone.

15. A process according to claim 14 wherein the recited steps are carried out continuously.

16. A process according to claim 15 wherein said thermoplastic polymer containing from about 1 to about 10 percent by weight of tetramethylene sulfone is prepared from 4,4'-methylenebis(phenyl isocyanate) and a mixture of adipic and azelaic acids, and said added diisocyanate is a liquefied form of 4,4'-methylenebis(phenyl isocyanate) dissolved in trixylyl phosphate as carrier.

17. A process according to claim 15 wherein said thermoplastic polymer containing from about 1 to about 10 percent by weight of tetramethylene sulfone is prepared from a mixture of 4,4'-methylenebis(phenyl isocyanate) with 2,4-toluenediisocyanate and a mixture of isophthalic and azelaic acids, and said added diisocyanate is 4,4'-methylenebis(phenyl isocyanate).

* * * * *